United States Patent
Helms et al.

(10) Patent No.: US 7,306,270 B2
(45) Date of Patent: Dec. 11, 2007

(54) FRONT BUMPER SYSTEM

(75) Inventors: James Helms, Fort Meyers, FL (US); Thomas G. Buckner, Gibsonia, PA (US)

(73) Assignee: IBIS Tek LLC, Butler, PA (US)

( * ) Notice: Subject to any disclaimer, the term of this patent is extended or adjusted under 35 U.S.C. 154(b) by 0 days.

(21) Appl. No.: 11/450,918

(22) Filed: Jun. 9, 2006

(65) Prior Publication Data

US 2006/0279096 A1    Dec. 14, 2006

Related U.S. Application Data

(60) Provisional application No. 60/690,565, filed on Jun. 13, 2005.

(51) Int. Cl.
*B60R 19/02* (2006.01)
*B60R 19/52* (2006.01)
*B60R 19/44* (2006.01)

(52) U.S. Cl. ............... 293/106; 293/115; 293/142

(58) Field of Classification Search ............ 293/102, 293/106, 115, 120, 142, 143
See application file for complete search history.

(56) References Cited

U.S. PATENT DOCUMENTS

| | | | | |
|---|---|---|---|---|
| 1,496,967 A | * | 6/1924 | Andersen | 293/143 |
| 2,144,695 A | * | 1/1939 | Van Schie | 293/143 |
| D155,607 S | * | 10/1949 | Helms et al. | D12/171 |
| 3,471,070 A | * | 10/1969 | Olson | 224/489 |
| 3,501,170 A | * | 3/1970 | Da Valle | 280/500 |
| 3,614,136 A | * | 10/1971 | Dent | 280/500 |
| 4,127,295 A | * | 11/1978 | Robinson | 293/117 |
| 4,674,782 A | * | 6/1987 | Helber | 293/106 |
| 4,714,287 A | * | 12/1987 | Merkle | 293/102 |
| 5,016,932 A | * | 5/1991 | Carter | 293/106 |
| 5,135,274 A | * | 8/1992 | Dodd | 293/117 |
| 5,215,343 A | * | 6/1993 | Fortune | 293/121 |
| 5,364,142 A | * | 11/1994 | Coiner | 293/117 |
| 5,823,585 A | * | 10/1998 | Tanguay | 293/106 |
| 5,979,953 A | * | 11/1999 | Rinehart | 293/106 |
| 6,290,271 B1 | * | 9/2001 | Geisler | 293/115 |
| 6,349,521 B1 | * | 2/2002 | McKeon et al. | 52/735.1 |
| 6,481,690 B2 | * | 11/2002 | Kariatsumari et al. | 293/155 |
| 6,523,873 B1 | * | 2/2003 | Summe et al. | 293/133 |
| 6,598,914 B1 | * | 7/2003 | Dixon | 293/106 |
| 6,682,111 B1 | * | 1/2004 | Houseman et al. | 293/115 |

FOREIGN PATENT DOCUMENTS

| | | | | |
|---|---|---|---|---|
| JP | 60169352 A | * | 9/1985 | 293/102 |
| JP | 05319187 A | * | 12/1993 | 293/115 |

* cited by examiner

*Primary Examiner*—Dennis H. Pedder
*Assistant Examiner*—Paul Chenevert
(74) *Attorney, Agent, or Firm*—Ware, Fressola, Van Der Sluys & Adolphson LLP

(57) ABSTRACT

A lightweight high-strength front bumper for a vehicle, having an elongated substantially hollow structure, with a protruding tubular strengthening member attached near the front face and also near the back face, so as to strengthen the spaced apart relation of the front face and back face. The bumper is typically substantially made of 6061 T6 aluminum or another high-strength, lightweight metal or allow with good workability. The bumper advantageously includes one or more storage compartments in the elongated structure.

6 Claims, 3 Drawing Sheets

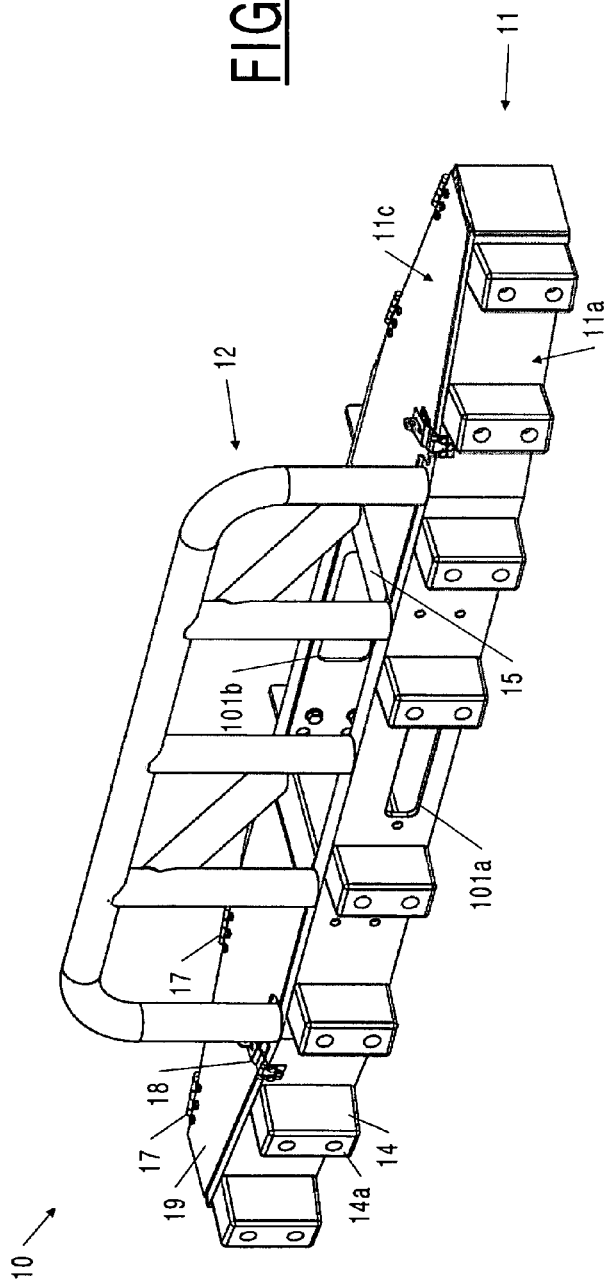

FRONT BUMPER SYSTEM

CROSS REFERENCE To RELATED APPLICATION

Reference is made to and priority claimed from U.S. provisional application Ser. No. 60/690,565 filed 13 Jun. 2005.

BACKGROUND OF THE INVENTION

1. Technical Field

The present invention pertains to the field of accessories for automotive vehicles. More particularly, the present invention pertains to a front bumper for an automotive vehicle.

2. Discussion of Related Art

An ordinary front bumper is a shield against low-speed collisions, typically made of steel, aluminum, rubber, or plastic, and mounted on the front of a vehicle. When a low-speed collision occurs, the bumper—along with its attachment to the vehicle—absorbs the shock to prevent or reduce damage to the vehicle. 49 CFR Part 581, entitled "The bumper standard" and called simply "the standard" hereinafter, prescribes performance requirements for passenger cars in low-speed front (and rear) collisions. It applies to front (and rear) bumpers on passenger cars, and is aimed at preventing damage to the car body and safety related equipment at barrier impact speeds of 2½ mph across the full width and 1½ mph on the corners. This is equivalent to a 5 mph crash into a parked vehicle of the same weight. The standard requires protection in the region 16 to 20 inches above the road surface, and the manufacturer can provide the protection by any means it wants. For example, some vehicles do not have a solid bumper across the vehicle, but meet the standard by strategically placed bumper guards and corner guards. Some bumpers use energy absorbers or brackets and others are made with a foam cushioning material. Ordinary front (and rear) bumpers are not designed to be structural components that would significantly contribute to vehicle crashworthiness.

At this time, the U.S. military is involved in conflicts of a sort sometimes called urban warfare. The HMMWV (High Mobility Multi-purpose Wheeled Vehicle) is often used on patrol in such conflicts. As provided, the HMMWV is susceptible to being disabled by an ordinary passenger vehicle ramming into the front end of the HMMWV. The HMMWV as usually provided does not even have a front bumper. Also, the HMMWV is not usually armored, and when disabled, the crew is usually at a great disadvantage because they are usually outnumbered, surrounded, and without cover.

In addition, a strategy used in attacking a HMMWV on patrol is to place a wrecked or disabled junk vehicle in the roadway at a place where there is no way for the HMMWV to get around the junk vehicle. Crew members then would sometimes have to exit the HMMWV and push the junk vehicle out of the way, and would be shot at while trying to get the junk vehicle out of the way.

What is therefore needed is a highly protective front bumper for the HMMWV and other vehicles used in such conflicts.

The prior art does provide highly protective front bumpers for such applications, but these are usually quite heavy, typically several hundred pounds, because of being made of steel. While there are advantages in having a steel front bumper, the HMMWV was not designed to maneuver with such a large amount of weight attached to the front.

In addition, the HMMWV is not a large vehicle, and is sometimes taken on extended duration patrols, and must then accommodate a large amount of supplies and equipment and several crew members. Storage space is therefore at a premium.

Thus, it would be advantageous to have a front bumper system that is not only high strength but also lightweight, and further, ideally, also includes some additional storage capacity.

DISCLOSURE OF INVENTION

Accordingly, in a first aspect of the invention, a vehicle bumper system is provided, comprising: an elongated substantially hollow structure, for mounting to the front of a vehicle so as to have a front face substantially parallel to the front surface of the vehicle and facing outward away from the vehicle, a back face in spaced apart relation with the front face and also substantially parallel to the front surface of the vehicle but facing toward the vehicle, and also a top substantially planar face and a bottom substantially planar face, wherein the elongated structure has a center portion and adjacent side portions formed from the front face and back face and also formed from the top face and bottom face, and the side portions taper down substantially in front to back width measured from the front face to the back face in a direction away from the center portion; and a protruding tubular strengthening member attached to the top face near the front face and also near the back face, so as to strengthen the spaced apart relation of the front face and back face; wherein at least the elongated structure is made from a high-strength lightweight metal or alloy, such as 6061 T6 aluminum.

In accord with the first aspect of the invention, the elongated structure may comprise a storage compartment.

Also in accord with the first aspect of the invention, the top face on at least one side portion may include a panel in hinged attachment to the hollow structure so as to allow pivoting the panel about the hinge in an opening and closing motion, thereby providing an enclosed storage compartment in the at least one side portion.

Also in accord with the first aspect of the invention, the vehicle bumper system may further comprise a plurality of bumper guard members distributed across the front face, and attached to and protruding from the front face.

Still also in accord with the first aspect of the invention, the center portion may have portals in the front face and back face, and may be open on the top face, for allowing the bumper system to fit over a winch on the front of the vehicle by mounting the bumper system so that the winch passes through the portal on the back face, with the steel cables of the winch passing through the portal in the front face.

A bumper according to the invention has been made for use with a HMMWV. It weighs less than one hundred pounds, and is able to move a 1500-pound junk vehicle out of its way without having to slow down below 30 mph.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a perspective view of a bumper according to the invention.

FIGS. 2-6 are, respectively, a side view (FIG. 2), a front view (FIG. 3), a top view (FIG. 4), a back view (FIG. 5), and a bottom view (FIG. 6) of the bumper of FIG. 1.

BEST MODE FOR CARRYING OUT THE INVENTION

Figure 4:
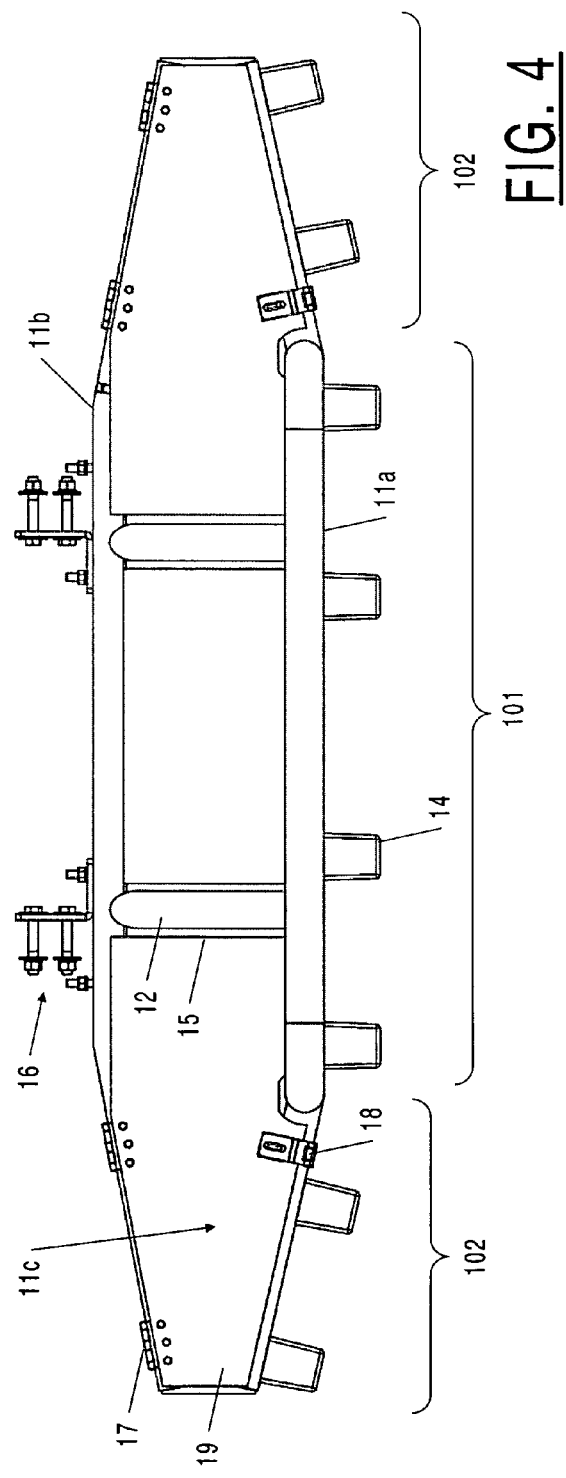

Referring now to FIG. 1 (perspective view) and FIG. 4 (front view), a front bumper system 10 according to the invention has an elongated hollow main member 11 having a front face ha and a back face 11b held in spaced apart relation with the front face near the center of the bumper by member 15, and a top face 11c with a protruding tubular strengthening member 12 attached to the top face near the front face and also near the back face, for strengthening the spaced apart relation of the front face and back face. In addition, bumper guard elements 14 are distributed across the front face, and are attached to and protrude from the front face. The bumper guard elements 14 advantageously have a replaceable rubber facing 14a. The main member 11 has a center portion 101 and adjacent side portions 102, and the side portions taper down substantially in front to back width in a direction away from the center portion, so as to be narrower in front to back width near the two ends of the main member. In other words, the side portions along the front face tapers rearwardly and the side portions along the back face tapers forwardly, but not necessarily touching one another. Using tapered side portions means the vehicle is lighter, and also easier to handle, i.e. less clearance needed for turning in tight spaces. The bumper system 10 is advantageously made substantially from 6061 T6 aluminum or another high-strength lightweight metal or alloy. The 6061 T6 aluminum has good workability; it is easy to weld (with proper equipment), drill, machine, saw, and punch. Alternatives include titanium metal, titanium alloys, and beryllium-aluminum alloys.

Referring still to FIGS. 1 and 4, a portion 19 of the top face on at least one side portion 102 is advantageously hinged to the back face 11b via one or more hinges 17 so as to allow pivoting the portion about the hinge in an opening and closing motion, and a latch 18 for latching and unlatching the portion 19 to and from the front face 11a. Thus, an enclosed storage compartment is provided in at least one side portion.

Figure 3:
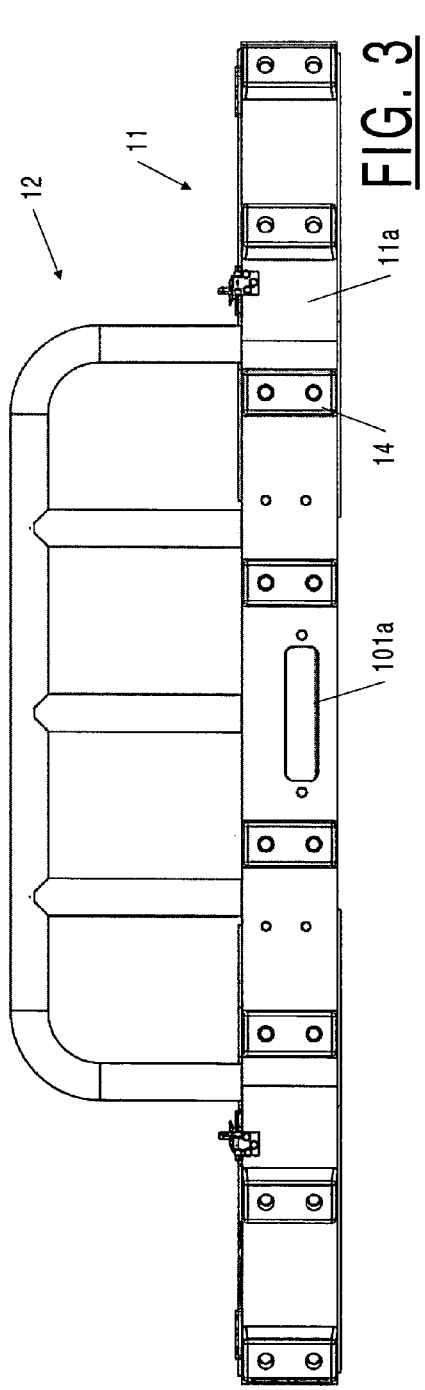
Figure 5:
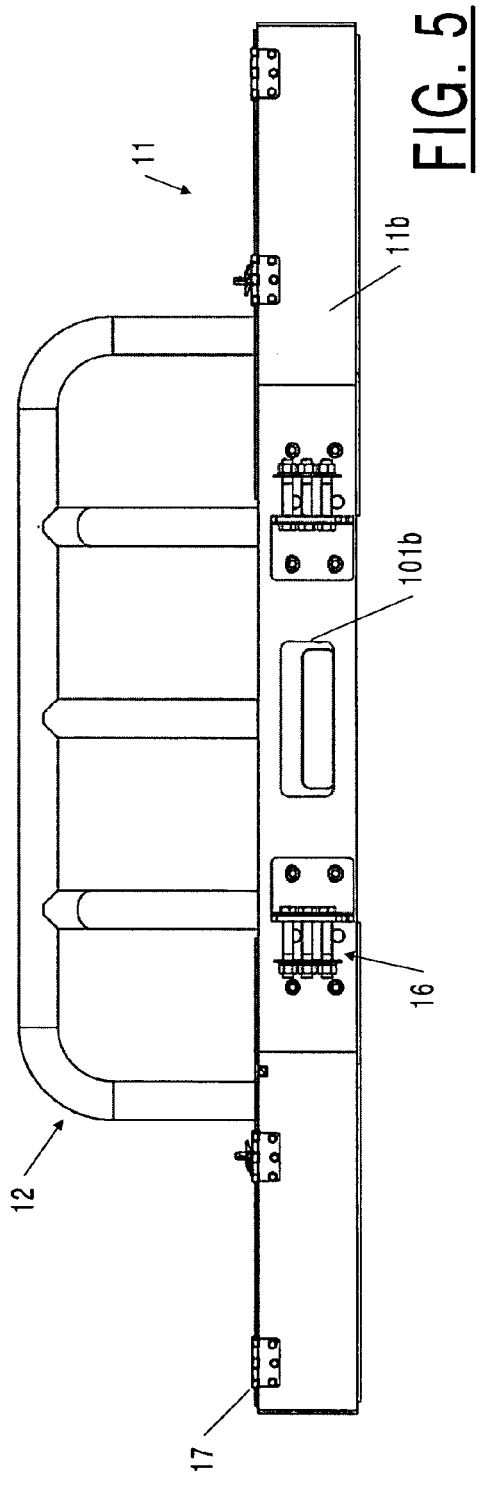
Figure 6:
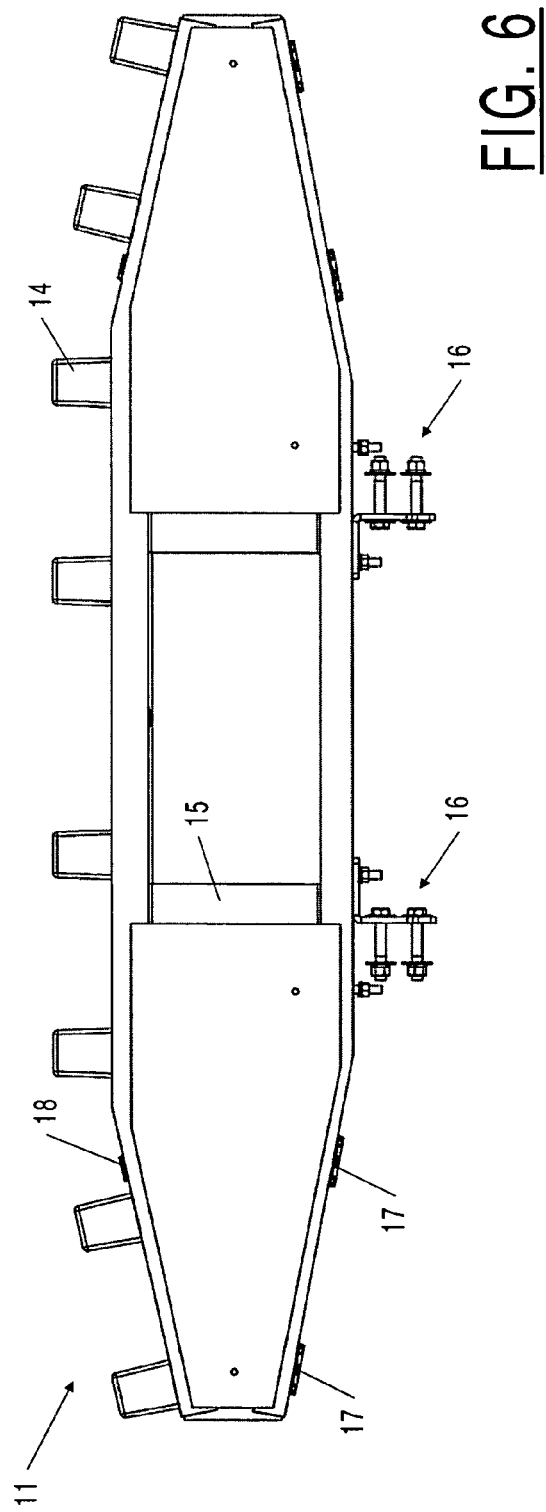

Still referring to FIGS. 1 and 4, and now also to FIG. 3 (front) and FIG. 5 (back), the center portion 101 has a portal 101a in the front face and a portal 101b in the back face, and is open on the top face. This allows the bumper system to fit over a winch on the front of the vehicle, by mounting the bumper system so that the winch passes through the portal 101b on the back face, with the steel cables of the winch passing through the portal 101a in the front face.

Referring now to FIG. 2 (side) and to FIG. 5 (back), the bumper system has a coupler 16 for attaching the bumper to the front of the vehicle.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A vehicle bumper system, comprising:
   an elongated substantially hollow structure, for mounting to the front of a vehicle so as to have a front face substantially parallel to the front surface of the vehicle and facing outward away from the vehicle, a back face everywhere in spaced apart relation with the front face and also substantially parallel to the front surface of the vehicle but facing toward the vehicle, and also a top substantially planar face and a bottom substantially planar face, wherein the elongated structure has a center portion and adjacent side portions formed from the front face and back face and also formed from the top face and bottom face, and the side portions taper down substantially in front to back width measured from the front face to the back face in a direction away from the center portion; and
   a protruding tubular strengthening member attached to the top face near the front face and also near the back face of the center portion, so as to strengthen the spaced apart relation of the front face and back face;
   wherein at least the elongated structure is made a high-strength lightweight metal or alloy.

2. A vehicle bumper system as in claim 1, wherein the high-strength lightweight metal or alloy is 6061 T6 aluminum.

3. A vehicle bumper system as in claim 1, wherein the elongated structure comprises a storage compartment.

4. A vehicle bumper system as in claim 1, wherein the top face on at least one side portion includes a panel in hinged attachment to the hollow structure so as to allow pivoting the panel about the hinge in an opening and closing motion, thereby providing an enclosed storage compartment in the at least one side portion.

5. A vehicle bumper system as in claim 1, further comprising a plurality of bumper guard members distributed across the front face, and attached to and protruding from the front face.

6. A vehicle bumper system as in claim 1, wherein the center portion has portals in the front face and back face, and is open on the top face, for allowing the bumper system to fit over a winch on the front of the vehicle by mounting the bumper system so that the winch passes through the portal on the back face, with the steel cables of the winch passing through the portal in the front face.

* * * * *

UNITED STATES PATENT AND TRADEMARK OFFICE
CERTIFICATE OF CORRECTION

PATENT NO. : 7,306,270 B2 Page 1 of 1
APPLICATION NO. : 11/450918
DATED : December 11, 2007
INVENTOR(S) : Helms et al.

It is certified that error appears in the above-identified patent and that said Letters Patent is hereby corrected as shown below:

In column 1, line 3, "to" should be --TO--.

In column 3, line 11, "ha" should be --11a--.

Signed and Sealed this

Twenty-seventh Day of May, 2008

JON W. DUDAS
*Director of the United States Patent and Trademark Office*